(12) United States Patent
Okawa et al.

(10) Patent No.: US 6,255,440 B1
(45) Date of Patent: Jul. 3, 2001

(54) COPOLYACETAL

(75) Inventors: Hidetoshi Okawa; Yoshihisa Tajima, both of Fuji (JP)

(73) Assignee: Polyplastics Co., Ltd. (JP)

( * ) Notice: Subject to any disclaimer, the term of this patent is extended or adjusted under 35 U.S.C. 154(b) by 0 days.

(21) Appl. No.: 09/646,752

(22) PCT Filed: Jul. 23, 1999

(86) PCT No.: PCT/JP99/03966

§ 371 Date: Sep. 21, 2000

§ 102(e) Date: Sep. 21, 2000

(87) PCT Pub. No.: WO00/05285

PCT Pub. Date: Feb. 3, 2000

(30) Foreign Application Priority Data

Jul. 24, 1999 (JP) .................................................. 10-209762
Jul. 24, 1999 (JP) .................................................. 10-209763
Jul. 24, 1999 (JP) .................................................. 10-209764

(51) Int. Cl.[7] ................................................ C08G 2/22
(52) U.S. Cl. .................. 528/250; 528/230; 528/248; 528/249; 528/403; 528/419; 528/421
(58) Field of Search .................. 528/230, 248, 528/249, 250, 403, 419, 421

(56) References Cited

U.S. PATENT DOCUMENTS

| | | |
|---|---|---|
| 3,442,860 | 5/1969 | Haffner et al. . |
| 3,442,865 | 5/1969 | Weissermel et al. . |
| 3,453,238 | 7/1969 | Fisher et al. . |
| 4,181,685 | 1/1980 | Kern et al. . |
| 5,079,330 | 1/1992 | Makabe et al. . |

FOREIGN PATENT DOCUMENTS

| | | |
|---|---|---|
| 1426835 | 3/1976 | (GB) . |
| 43-26873 | 4/1965 | (JP) . |
| B1-43 26871 | 5/1965 | (JP) . |
| 44-28509 | 11/1969 | (JP) . |
| 49-53286 | 5/1974 | (JP) . |
| 61-12713 | 1/1986 | (JP) . |
| 2-214714 | 8/1990 | (JP) . |
| 3-109411 | 5/1991 | (JP) . |
| 3-170526 | 7/1991 | (JP) . |
| 4-266917 | 9/1992 | (JP) . |
| 08231665 | 9/1996 | (JP) . |

OTHER PUBLICATIONS

Chem. abst., vol. 81, No. 18, Nov. 1974, p. 14, col. 2, the abstract No. 106175y.

Primary Examiner—Samuel A. Acquah
(74) Attorney, Agent, or Firm—Nixon & Vanderhye P.C.

(57) ABSTRACT

Polyacetal copolymers, obtained by copolymerizing (A) 100 parts by weight of trioxane, (B) 0.01 to 10 part(s) by weight of at least one compound selected from among glycidyl ether compounds of the following general formula (I), (II) or (III) and (C) 0 to 20 part(s) by weight of a cyclic ether compound [excluding the glydicyl ether compound (B)] copolymerizable with trioxane, are a polyacetal resin having a high rigidity, excellent creep properties, a high surface hardness and excellent sliding properties:

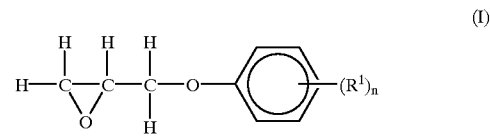

(I)

wherein $R^1$ is a $C_{1-12}$ alkyl group, an aryl group or a substtituted aryl group;

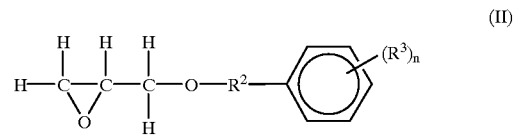

(II)

wherein $R^2$ represents a $C_{2-20}$ polyalkylene oxide glycol residue;

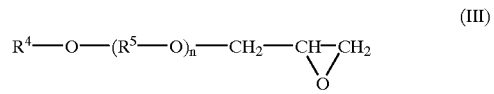

(III)

wherein $R^4$ represents an alkyl group having 1 to 30 carbon atoms; $R^5$ represents an alkylene group having 1 to 30 carbon atoms.

10 Claims, No Drawings

COPOLYACETAL

Background of the Invention

1. Technical Field

The present invention relates to polyacetal resins having high rigidity, excellent creep property, high surface hardness and excellent sliding property.

2. Prior Art

Polyacetal resins have excellent properties in terms of mechanical property, thermal property, electric property, sliding property, molding property, etc. and have been widely used in electric appliances, automobile parts, precision instrument parts, etc. mostly as constituting materials, mechanical parts, etc. thereof. However, as a result of expansion of the fields to which polyacetal resins are used, there are some cases where further improvements in rigidity and creep property are demanded. As a means for improving such physical properties, a method where fibrous fillers are filled inpolyacetal resin, a method where a comonomer amount is reduced in the case of polyacetal copolymers, etc. have been known. However, in filling the fibrous filler, problems such as a poor appearance of the molded product and a lowering of the sliding property are resulted while, in the means of reducing the amount of comonomers, problems such as a lowering of thermal stability of the polymer are resulted and, therefore, they do not always meet with the demands.

In view of such problems in the prior art, the present inventors paid their attention to an essential improvement in rigidity and creep property of the polymer by modification of the polymer structure itself.

In the meanwhile, with regard to modification of the polymer structure itself, there are disclosures in JP-A3-170526 and others on modified polyacetal copolymers prepared by copolymerization of trioxane, at least one cyclic ether compound selected from ethylene oxide, 1,3-dioxolane, 1,3-dioxepane, 1,3,5-trioxepane and 1,3,6-trioxocane, and at least one compound selected from glycidyl phenyl ether, styrene oxide and glycidyl naphthyl ether. However, an object of the modified polyacetal copolymers is to improve the molding property, particularly the high cycling property, by an increase in crystallizing rate and, in addition, the effect of improving the rigidity by those copolymers has been found to be not so satisfactory according to the test by the present inventors.

DISCLOSURE OF THE INVENTION

An object of the present invention is to solve the above problems and to offer copolymerized polyacetal resins having high rigidity, excellent creep property and, in addition, excellent surface property, sliding property, etc.

The present inventors have carried out an intensive investigation for achieving the above-mentioned object and have unexpectedly found that it is now possible to increase a rigidity and to improve a creep property to such an extent that have been unforeseeable by the polyacetal copolymers where branched structures are introduced by copolymerization of a certain type of specific glycidyl ether compound whereupon the present invention has been achieved.

Thus, the present invention relates to polyacetal copolymers obtained by copolymerizing (A) 100 parts by weight of trioxane, (B) 0.01 to 10 part(s) by weight of at least one compound selected from glycidyl ether compounds represented by the following formula (I), (II) or (III) and (C) 0 to 20 part(s) by weight of a cyclic ether compound [excluding the glycidyl ether compound (B) mentioned hereinabove] which is copolymerizable with trioxane:

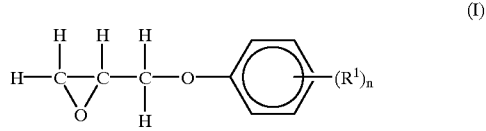
(I)

wherein $R^1$ is a substituent for hydrogen(s) on a phenyl group and is a $C_{1-12}$ alkyl group, a substituted alkyl group, an aryl group, a substituted aryl group or halogen; n is an integer of 1 to 5; and when n is 2 or more, the $R^1$ groups may be the same or different;

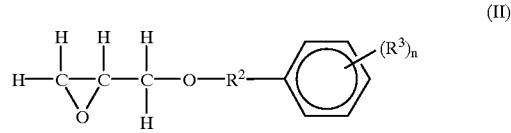
(II)

wherein $R^2$ represents a $C_{2-20}$ polyalkylene oxide glycol residue, a $C_{1-20}$ alkylene group or a substituted alkylene group; $R^3$ represents a replacement for hydrogen atoms of the phenyl group and is a $C_{1-12}$ alkyl group, a substituted alkyl group, an aryl group, a substituted aryl group or a halogen; and n represents an integer of 0 to 5, provided when n is 2 or more, $R^3$'s may be the same or different. The $C_{2-20}$ polyalkylene oxide glycol residue may be a poly(oxyalkylene) group having 2 to 20 carbon atoms and the alkylene may be preferably ethylene or propylene;

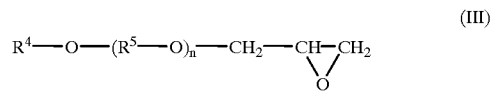
(III)

wherein $R^4$ represents an alkyl group having 1 to 30 carbon atoms, or an alkenyl or alkynyl group having 2 to 20 carbon atoms; $R^5$ represents an alkylene group having 1 to 30 carbon atoms; and n represents an integer of 0 to 20.

The component (B) is any one of the formulae (I), (II), (III).

The phenyl group of the component (B) preferably has at least an ortho-substituent $R^1$, particularly in the formula (I). Preferably, the ortho-substituent $R^1$ exerts a steric hindrance.

DETAILED DESCRIPTION OF THE INVENTION

As hereunder, the polyacetal copolymers of the present invention will be illustrated in detail.

Firstly, trioxane (A) used in the present invention is a cyclic trimer of formaldehyde. Usually, it is prepared by the reaction of an aqueous solution of formaldehyde in the presence of an acidic catalyst and is used after purifying it by means of distillation or the like. It is preferred that trioxane (A) used for the polymerization contains as little as possible of impurities such as water, methanol and formic acid.

Secondly, specific examples of the compound of the component (B) represented by the formula (I) are tert-butylphenyl glycidyl ether, sec-butylphenyl glycidyl ether, n-butylphenyl glycidyl ether, phenylphenol glycidyl ether, cresyl glycidyl ether and dibromocresyl glycidyl ether. From the standpoint of thermal stability of the resultant polyacetal copolymers, the glycidyl ether compounds used in the present invention preferably has at least an ortho-subsituent $R^1$ and further exerts steric hindrance, for example, a phenyl group and a tert-butyl group, in particular.

Preferred examples of the compound of the component (B) represented by the formula (II) include benzyl glycidyl ether and a compound of the following structural formula (II'):

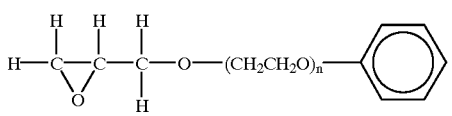

(II')

wherein n is an integer of 1 to 10.

Examples of the preferred compound of the component (B) include the following formula (III'):

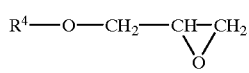

(III')

wherein $R^4$ represents an alkyl group having 1 to 30 carbon atoms. In addition, methyl glycidyl ether, ethyl glycidyl ether, butyl glycidyl ether, 2-ethylhexyl glycidyl ether and 2-methyloctyl glycidyl ether are cited.

The copolymerizing amount of the component (B) to 100 parts by weight of trioxane [the component (A)] is 0.01–10 part(s) by weight or, preferably, 0.1–10 part(s) by weight.

When the copolymerizing amount of the component (B) is less than that, production of the branched structure due to the component (B) is too little to give the improving effect in rigidity and creep properties which is an object of the present invention while, when it is more than that, disadvantages such as a lowering of crystallinity causing a decrease in rigidity are resulted.

Examples of the cyclic ether compound (C) which is copolymerizable with trioxane (A) in the polyacetal copolymers of the present invention are ethylene oxide, propylene oxide, butylene oxide, epichlorohydrin, epibromohydrin, styrene oxide, oxetane, 3,3-bis(chloromethyl)oxetane, tetrahydrofuran, trioxepane, 1,3-dioxolane, ethylene glycol formal, propylene glycol formal, diethylene glycol formal, triethylene glycol formal, 1,4-butanediol formal, 1,5-pentanediol formal and 1,6-hexanediol formal. The copolymerizing amount of the cyclic ether compound (C) in the present invention is 0–20 part(s) by weight, preferably 0.05–15 part(s) by weight or, particularly preferably 0.1–10 part(s) by weight, to 100 parts by weight of trioxane, component (A). Although such a cyclic ether compound (C) is not particularly necessary for improvement of rigidity and creep property which is an object of the present invention, it is preferred to use the cyclic ether compound (c) as a copolymerizing component for stabilizing the polymerization reaction and also for increasing the thermostability of the resulting polyacetal copolymer. On the other hand, when the copolymerizing amount of the cyclic ether compound (c) is too much, improvement in rigidity and creep property which is an object of the present invention is insufficient. The above-mentioned copolymerizing amount of the cyclic ether compound (C) has been decided taking such a view into consideration.

Fundamentally, the polyacetal copolymers of the present invention are manufactured by a method where trioxane (A), a glycidyl ether compound (B) and a cyclic ether compound (C) are subjected to a bulk polymerization using a cationic polymerization catalyst where, if necessary, an appropriate amount of a molecular weight regulator is added thereto.

Here, an Avrami index (m) of the polyacetal copolymers of the present invention determined from crystallizing rate is preferably 3 and, when this requirement is satisfied, the polyacetal copolymers having far better rigidity, creep property, etc. are prepared. Incidentally, the Avrami index is calculated as follows. Thus, the polyacetal copolymer is kept at a heating state of 200° C. for three minutes in a nitrogen atmosphere using a differential scanning calorimeter (DSC) then cooled down to the crystallizing temperature thereof and maintained at this temperature to obtain crystallizing peaks. A calculation is conducted by the following formulae from the shape of the peaks to obtain an Avrami index.

$v=(4\pi/3)\{G(t-\tau)\}^3$ $X_0=\int^t_0 Nv\, d\tau=kt^m$ $X=1-\exp(-X_0)=1-\exp(-kt^m)$ In the formulae, X is morphocrystallinity, $\tau$ is waiting time until growth of spherulite beings, v is volume of the spherulite grown from one spherulite, N is numbers of crystalline nuclei, $X_0$ is ratio of total volume occupied by spherulite after t hours, k is rate constant and m is Avrami index.

In order to satisfy the above preferred requirements, it is quite effective in the manufacture of the polyacetal copolymers by polymerization to use a method where a homogeneous solution in which trioxane (A), a glycidyl ether compound (B) and a cyclic ether compound (C) are well mixed is supplied to a polymerizing apparatus followed by adding a catalyst or a method where a glycidyl ether compound (B), a cyclic ether compound (C) and a catalyst are homogeneously mixed previously and further mixed with melted trioxane (A) followed by supplying to a polymerizing apparatus to polymerize or the above mixture is added to melted trioxane (A) which is supplied to a polymerizing apparatus separately followed by polymerizing. When the materials are previously mixed to result in a state of a homogeneous solution as such, the dispersing state of branched structures derived from glycidyl ether compound becomes good, the polyacetal copolymer having an Avrami index (m) of 3 is easily prepared and the product has excellent rigidity and creep property.

On the contrary, in a method where trioxane (A), a glycidyl ether compound (B) and a cyclic ether compound (C) are supplied to a polymerizing apparatus separately and then a catalyst is added thereto or in a method where a catalyst is added to trioxane (A) and then other components are added, dispersion of the branched structures derived from the glycidyl ether compound in the polyacetal skeleton is apt to be insufficient and, in that case, the Avrami index (m) of 3 cannot be achieved and an effect of improvement of rigidity and creep property is somewhat inferior to that mentioned hereinabove.

There is no particular limitation for the apparatus for polymerization in the manufacture of the polyacetal copolymers of the present invention but known apparatuses may be used and any of a batch method, a continuous method, etc. maybe applicable. It is preferred to keep the polymerization temperature at 65–135° C. Deactivation after the polymerization is carried out by adding a basic compound or an aqueous solution thereof to a reaction product discharged from the polymerizing apparatus after the polymerization reaction or to a reaction product in the polymerizing apparatus.

Examples of the cationic polymerization catalyst used in the present invention are lead tetrachloride, tin tetrachloride, titanium tetrachloride, aluminum trichloride, zinc chloride, vanadium trichloride, antimony trichloride, phosphorus pentafluoride, antimony pentafluoride, boron trifluoride and a coordination compound thereof such as boron trifluoride diethyl etherate, boron trifluoride dibutyl etherate, boron trifluoride dioxanate, boron trifluoride acetic anhydrate, boron trifluoride triethylamine complex, etc., inorganic and organic acids such as perchloric acid, acetyl perchlorate, tert-butyl perchlorate, hydroxyacetic acid, trichloroacetic acid, trifluoroacetic acid, p-toluenesulfonic acid, etc., complex salt compounds such as triethyloxonium tetrafluoroborate, triphenylmethyl hexafluoroantimonate, allyldiazonium hexafluorophosphate, allyldiazonium tetrafluoroborate, etc., alkyl metal salts such as diethyl zinc, triethyl aluminum, diethylaluminum chloride, etc., heteropolyacids and isopolyacids. Particularly preferred examples among them are boron trifluoride and coordination compounds thereof such as boron trifluoride diethyl etherate, boron trifluoride dibutyl etherate, boron trifluoride dioxanate, boron trifluoride acetic anhydrate and boron trifluoride triethylamine complex. Such a catalyst may be previously diluted with an organic solvent or the like and then used.

In addition to the above components, a chemical component which is capable of forming a branched structure may be used in the polyacetal copolymers of the present invention. Examples of the component capable of forming a branched structure are ethylene glycol diglycidyl ether, propylene glycol diglycidyl ether, 1,4-butanediol diglycidyl ether, hexamethylene glycol diglycidyl ether, resorcinol diglycidyl ether, bisphenol A diglycidyl ether, polyethylene glycol diglycidyl ether, polypropylene glycol diglycidyl ether, polybutylene glycol diglycidyl ether, glycerol and its derivatives, and pentaerythritol and its derivatives.

Examples of the molecular weight regulator used in the present invention are low-molecular acetal compound having alkoxy groups such as methylal, methoxymethylal, dimethoxymethylal, trimethoxymethylal, oxymethylene di-n-butyl ether, etc., alcohol such as methanol, ethanol, butanol, etc., and ester compounds. Among them, low molecular acetal compounds having alkoxy groups are particularly preferred. There is no limitation at all for the amount of such a molecular weight regulator to be added so far as the effect of the present invention is not deteriorated.

With regard to a basic compound for neutralizing and deactivating the polymerization catalyst, ammonia, amines such as triethylamine, tributylamine, triethanolamine, tributanolamine, etc., hydroxide salts of alkali metal or alkali earth metal and other known catalyst deactivators may be used. It is preferred that, after the polymerization, an aqueous solution thereof is added to the product without delay to conduct deactivation. After such apolymerization and an deactivation, washing, separation/recovery of unreacted monomer, drying, etc. may be carried out by conventional methods, if necessary.

In addition, a stabilizing treatment such as decomposition/removal of unstable terminals and sealing of unstable terminals by a stable material is carried out by a known method if necessary and a necessary stabilizer is compounded therewith. Examples of the stabilizer used here are one or more of hindered phenol compounds, nitrogen-containing compounds, alkali or alkali earth metal hydroxides, inorganic salts, carboxylic acids, etc. Further, one or more common additive(s) such as coloring agents (e.g. dyes and pigments), lubricants, nucleating agent, releasing agents, antistatic agents, surface-active agents, organic polymer materials and inorganic or organic fillers in a form of fiber, powder or plate may be added.

There is no particular limitation for the degree of polymerization, etc. of the polyacetal copolymer of the present invention and adjustment of the degree of polymerization, etc. depending upon the object of use and the molding means is possible. However, when the product is used for molding, the melt index (MI) measured at the temperature of 190° C. with the load of 2.06 kg is preferably 1–100 g 10 minutes or, particularly preferably, 2–90 g/10 minutes.

Although the mechanism why the polyacetal copolymer of the present invention shows an excellent effect in rigidity and creep property is not so clear, the present inventors presume it to be almost as follows.

Thus, inapolyacetal polymerwhich is a crystalline resin, its molecule is folded during the course of cooling and solidification from melted state in molding, etc. and forms a lamella structure. When load such as bending or tension is applied to the molded product, sliding at the interface of the lamella takes place whereupon torsion is resulted together with a release of stress at the same time although a destruction takes place when the load is more than the limited value. However, the polyacetal copolymer of the present invention has a branched structure and, therefore, an anchor effect is resulted because a branched part of the polymer molecule constituting one lamella is entangled with a polymer molecule constituting the adjacent lamella or comes into this lamella and, as a result, resistance to sliding at the lamella interface under stress increases and that is presumed to contribute to the improvement in rigidity and creep property. It is also presumed that an appropriate branch length or branch of an appropriate molecular weight caused by the glycidyl ether compound (B) used in the present invention is a factor for causing the far more effect as a result of the above mechanism.

EXAMPLES

The present invention will now be further illustrated by way of the following examples although the present invention is not limited thereto.

Incidentally, items of the evaluated properties and measuring methods therefor are as follows.

Avrami Index

Avrami index was calculated by the method mentioned above.

Tensile Strength

A test piece of a dumbbell type was molded using an injection molding apparatus and the measurement was carried out according to a method of ASTM D638.

Bending Test

A test piece was molded using an injection molding apparatus and the measurement was carried out according to a method of ASTM.

Measurement of Rockwell Hardness

A test piece was molded using an injection molding apparatus and the measurement was carried out according to a method of ASTM.

Molten/Kneaded State

The state, when molten/kneaded for removing unstable part, of a crude polyacetal resin was visually observed and evaluated by four grades; ⊚: splendidly excellent, ○: excellent, Δ: slightly foamed and X: heavily foamed.

Examples 1–5

A continuous mixing reactor which is equipped with an outside jacket for passing hot (cold) medium therethrough and is constituted from a barrel having a cross section in such a shape that two circles are partly overlapped and also from a rotating axis having a paddle was used and, under rotation of the two rotating axes equipped with paddles at the rate of 150 rpm, a homogeneously mixed solution of trioxane (A), a glycidyl ether compound (B) and a cyclic ether compound (1,3-dioxolane) (C) as shown in Table 1 was supplied into apolymerizing apparatus (hereinafter, this will be called "a solution adding method") and methylal (a molecular weight regulator) and a solution of boron trifluoride dibutyl ether (a catalyst) in dibutyl ether (corresponding to 0.01% by weight on a basis of boron trifluoride to trioxane) were continuously added/supplied thereto whereupon a bulk polymerization was carried out. The reaction product discharged from the polymerizing apparatus was quickly passed through a pulverizing device together with adding to an aqueous solution of 60° C. containing 0.05% by weight of triethylamine to deactivate the catalyst. After that, separation, washing and drying were conducted to give a crude polyacetal copolymer. To 100 parts by weight of the crude polyacetal resin were added 4% by weight of a 5% by weight aqueous solution of triethylamine and 0.3% by weight of pentaerythrityl tetrakis[3-(3,5-di-tert-butyl-4-hydroxyphenyl) propionate] and the mixture was melted and kneaded at 210° C. in a two-axial extruder to remove the unstable parts. After that, 0.03 part by weight of pentaerythrityl tetrakis [3-(3,5-di-tert-butyl-4-hydroxyphenyl) propionate] (a stabilizer) and 0.15 part by weight of melamine were added and the mixture was melted and kneaded at 210° C. in a two-axial extruder to give a polyacetal copolymer in a form of pellets.

Comparative Examples 1–2

Polymerization was carried out by the same method as in Examples 1–5 using a composition as shown in Table 1 without the use of a glycidyl ether compound (B) and, after deactivation of the catalyst and removal of the unstable part were conducted, a stabilizer was added thereto and kneaded therewith to give a polyacetal copolymer in a form of pellets. Incidentally, in Comparative Example 1, the amount of the component (C) was made almost equimolar to the sum of the components (B) and (C) in Examples 1–5.

Example 6

The same apparatus as in Examples 1–5 was used and trioxane, 1,3-dixolane, a compound (B) and methylal (a molecular weight regulator) were continuously but separately added (a separately adding method) to conduct a polymerization and, after the same treatment as in Examples 1–5, a stabilizer was added thereto and kneaded therewith to give a polyacetal copolymer in a form of pellets.

Comparative Examples 3–4

Polymerization was carried out in the composition as shown in Table 1 by the same method as in Example 6 without the use of a glycidyl ether compound (B) and, after the same treatment, a stabilizer was added thereto and kneaded therewith to give a polyacetal copolymer in a form of pellets. Incidentally, in Comparative Example 3, the amount of the component (C) was adjusted in the same manner as in Comparative Example 1.

Results of evaluation are given in Table 1

TABLE 1

| | Composition | | | | | Supplying | | | | | Molten/ |
|---|---|---|---|---|---|---|---|---|---|---|---|
| | Trioxane (wt. pts) | (B) | wt. pts | (C) | wt. pts | Avrami Index | (B) upon Polymn | TS (MPa) | BM (MPa) | RH (M scale) | Knaded State |
| Ex. 1 | 100 | BPGE | 2.50 | DO | 2.57 | 3 | Soln | 62.6 | 2631 | 95.2 | Δ |
| Ex. 2 | 100 | BPGE | 0.59 | DO | 3.20 | 3 | Soln | 60.5 | 2580 | 92.5 | ○ |
| Ex. 3 | 100 | PPGE | 2.62 | DO | 2.57 | 3 | Soln | 62.3 | 2628 | 94.8 | ⊚ |
| Ex. 4 | 100 | PPGE | 0.65 | DO | 3.20 | 3 | Soln | 60.2 | 2560 | 92.0 | ⊚ |
| Ex. 5 | 100 | CGE | 2.62 | DO | 2.57 | 3 | Soln | 62.8 | 2635 | 95.9 | Δ |
| Com. Ex. 1 | 100 | — | 0 | DO | 3.41 | 4 | Soln | 58.0 | 2267 | 82.1 | ⊚ |
| Com. Ex. 2 | 100 | — | 0 | DO | 2.57 | 4 | Soln | 58.6 | 2310 | 82.3 | ⊚ |
| Ex. 6 | 100 | BPGE | 2.48 | DO | 2.57 | 4 | Sep | 60.0 | 2550 | 94.3 | Δ |
| Com. Ex. 3 | 100 | — | 0 | DO | 3.41 | 4 | Sep | 57.5 | 2245 | 82.2 | ⊚ |
| Com. Ex. 4 | 100 | — | 0 | DO | 2.57 | 4 | Sep | 57.9 | 2305 | 82.3 | ⊚ |

TS: Tensile Strength,
BM: Bending Modulus,
RH: Rockwell Hardness,
BPGE: p-tert-butylphenyl glycidyl ether,
PPGE: o-phenylphenol glycidyl ether,
CGE: m-cresyl glycidyl ether,
DO: 1,3-dioxolane,
Soln: a solution adding method, and
Sep: a separately adding method Examples 7–9

Polymerization, removal of unstable part and addition/kneading of a stabilizer were carried out by the same apparatus and method as in Examples 1–5 except for using a compound (B) shown in Table 2 to give a polyacetal copolymer in a form of pellets.

Example 10

Polymerization was carried out by the same method as in Example 6 except for using a compound (B) shown in Table 2 and, after removing theunstablepart, a stabilizerwas added thereto and kneaded therewith to give a polyacetal copolymer in a form of pellets.

Examples 11–12

Polymerization, removal of unstable part and addition/kneading of a stabilizer were carried out in the same apparatus as and by the same method as in Examples 1–5, except for changing the glycidyl ehter compound (B), to give a polyacetal copolymer in the form of pellets.

Comparative Examples 5–6

Polymerization, removal of unstable part and addition/kneading of a stabilizer were carried out by the same apparatus and method as in Examples 1–5 except that a glycidyl ether compound (B) was not used as a copolymerizing component to give a polyacetal copolymer in a form of pellets.

Comparative Examples 7–8

Polymerization, removal of unstable part and addition/kneading of a stabilizer were carried out by the same apparatus and method as in Example 6 except that a glycidyl ether compound (B) was not used as a copolymerizing component to give a polyacetal copolymer in a form of pellets.

Results of evaluation are given in Table 2.

Example 18

Polymerization was carried out by the same method as in Example 6 except for using a compound (B) shown in Table 3 and, after removing the unstable part, a stabilizer was added thereto and kneaded therewith to give a polyacetal copolymer in a form of pellets.

Comparative Examples 9–10

Polymerization, removal of unstable part and addition/kneading of a stabilizer were carried out by the same apparatus and method as in Examples 1–5 except that a glycidyl ether compound (B) was not used as a copolymerizing component to give a polyacetal copolymer in a form of pellets.

Comparative Examples 11–12

Polymerization, removal of unstable part and addition/kneading of a stabilizer were carried out by the same apparatus and method as in Example 6 except that a glycidyl ether compound (B) was not used as a copolymerizing component to give a polyacetal copolymer in a form of pellets.

Results of evaluation are given in Table 1.

TABLE 2

| | Composition | | | | Avrami Index | Supplying | TS (MPa) | BM (MPa) | RH (M scale) | Molten/Knaded State |
|---|---|---|---|---|---|---|---|---|---|---|
| | Trioxane (wt. pts) | (B) | wt. pts | (C) | wt. pts | | (B) upon Polymn | | | | |
| Ex. 7 | 100 | Compd A | 1.12 | DO | 3.00 | 3 | Soln | 62.6 | 2631 | 95.2 | Δ |
| Ex. 8 | 100 | Compd A | 0.45 | DO | 3.26 | 3 | Soln | 60.5 | 2558 | 92.5 | ○ |
| Ex. 9 | 100 | Compd A | 0.22 | DO | 3.34 | 3 | Soln | 61.2 | 2520 | 92.0 | ○ |
| Ex. 10 | 100 | Compd A | 1.12 | DO | 3.00 | 4 | Sep | 60.2 | 2560 | 92.0 | Δ |
| Ex. 11 | 100 | Compd B | 0.3 | DO | 3.00 | 3 | Soln | 66.0 | 2740 | 91.5 | ⊚ |
| Ex. 12 | 100 | Compd C | 0.4 | DO | 3.00 | 3 | Soln | 67.3 | 2820 | 92.3 | ○ |
| Com. Ex. 5 | 100 | — | — | DO | 3.43 | 4 | Soln | 57.6 | 2235 | 82.0 | ⊚ |
| Com. Ex. 6 | 100 | — | — | DO | 3.00 | 4 | Soln | 58.0 | 2270 | 82.1 | ⊚ |
| Com. Ex. 7 | 100 | — | — | DO | 3.43 | 4 | Sep | 57.7 | 2230 | 82.1 | ⊚ |
| Com. Ex. 8 | 100 | — | — | DO | 3.00 | 4 | Sep | 58.1 | 2265 | 82.3 | ⊚ |

TS: Tensile Strength, BM: Bending Modulus, RH: Rockwell Hardness,
DO: 1,3-dioxolane, Soln: a solution adding method, Sep: a separately adding method, and Compound A:

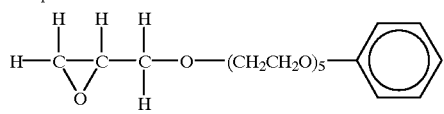

Compound B:

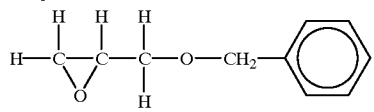

Compound C:

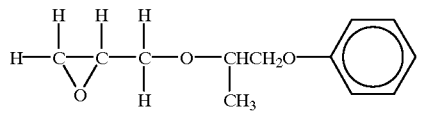

Examples 13–17

Polymerization, removal of unstable part and addition/kneading of a stabilizer were carried out by the same apparatus and method as in Examples 1–5 except for using a compound (B) shown in Table 3 to give a polyacetal copolymer in a form of pellets.

In the above Examples 13–18 and Comparative Examples 9–12, all the resins were in the splendidly excellent state, when molten/kneaded for removing unstable part of the crude polyacetal resin, and foaming was not observed.

TABLE 3

|  | Composition | | | | Supplying | | | | | Molten/ |
| --- | --- | --- | --- | --- | --- | --- | --- | --- | --- | --- |
|  | Trioxane (wt. pts) | (B) | wt. pts | (C) | wt. pts | Avrami Index | (B) upon Polymn | TS (MPa) | BM (MPa) | RH (M scale) | Knaded State |
| Ex. 13 | 100 | BGE | 0.75 | DO | 3.00 | 3 | Soln | 63.0 | 2520 | 92.0 | ◎ |
| Ex. 14 | 100 | BGE | 0.38 | DO | 3.21 | 3 | Soln | 61.5 | 2450 | 90.1 | ◎ |
| Ex. 15 | 100 | BGE | 0.15 | DO | 3.34 | 3 | Soln | 61.0 | 2400 | 89.7 | ◎ |
| Ex. 16 | 100 | EHGE | 1.08 | DO | 3.00 | 3 | Soln | 62.8 | 2510 | 91.8 | ◎ |
| Ex. 17 | 100 | MOGE | 1.08 | DO | 3.00 | 3 | Soln | 62.9 | 2512 | 91.5 | ◎ |
| Ex. 18 | 100 | BGE | 0.73 | DO | 3.00 | 4 | Sep | 61.0 | 2470 | 89.0 | ◎ |
| Com. Ex. 9 | 100 | — | | DO | 3.40 | 4 | Soln | 58.0 | 2267 | 82.1 | ◎ |
| Com. Ex. 10 | 100 | — | | DO | 3.00 | 4 | Soln | 58.2 | 2295 | 82.3 | ◎ |
| Com. Ex. 11 | 100 | — | | DO | 3.40 | 4 | Sep | 58.0 | 2272 | 82.0 | ◎ |
| Com. Ex. 12 | 100 | — | | DO | 3.00 | 4 | Sep | 58.2 | 2302 | 82.2 | ○ |

TS: Tensile Strength,
BM: Bending Modulus,
RH: Rockwell Hardness,
BGE: n-butyl glycidyl ether,
EHGE: 2-ethylhexyl glycidyl ether
MOGE: 2-methyloctyl glycidyl ether,
DO: 1,3-dioxolane,
Soln: a solution adding method,
Sep: a separately adding method

What is claimed is:

1. Polyacetal copolymers obtained by copolymerizing (A) 100 parts by weight of trioxane, (B) 0.01 to 10 part(s) by weight of at least one compound selected from glycidyl ether compounds of the following general formula (I), (II) or (III) and (C) 0 to 20 part(s) by weight of a cyclic ether compound copolymerizable with trioxane:

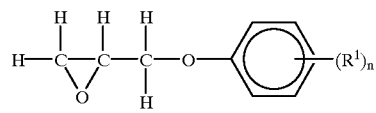
(I)

wherein $R^1$ is a substituent for hydrogen (s) on a phenyl group and is a $C_{1-12}$ alkyl group, a substituted alkyl group, an aryl group, a substituted aryl group or halogen; n is an integer of 1 to 5; and when n is 2 or more, the $R^1$ groups may be the same or different;

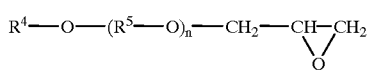
(II)

wherein $R^2$ represents a $C_{2-20}$ polyalkylene oxide glycol residue, a $C_{1-20}$ alkylene group or a substituted alkylene group; $R^3$ represents a replacement for hydrogen atoms of the phenyl group and is a $C_{1-12}$ alkyl group, a substituted alkyl group, an aryl group, a substituted aryl group or a halogen; and n represents an integer of 0 to 5, provided when n is 2 or more, $R^3$'s may be the same or different;

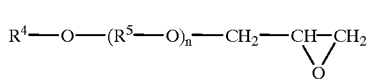
(III)

wherein $R^4$ represents an alkyl group having 1 to 30 carbon atoms, or an alkenyl or alkynyl group having 2 to 20 carbon atoms; $R^5$ represents an alkylene group having 1 to 30 carbon atoms; and n represents an integer of 0 to 20.

2. The polyacetal copolymers as claimed in claim 1, wherein the glycidyl ether compound (B) of the formula (I) is at least one compound selected from the group consisting of butylphenyl glycidyl ether, phenylphenol glycidyl ether, cresyl glycidyl ether and dibromocresyl glycidyl ether.

3. The polyacetal copolymers as claimed in claim 1, wherein $R^2$ of the formula (II) is a polyethylene oxide glycol residue.

4. The polyacetal copolymers as claimed in claim 1, wherein the glycidyl ether compound (B) is at least one member selected from those of the following general formula (III'):

$$R^4-O-CH_2-CH-CH_2 \atop \underset{O}{\diagdown\diagup}$$
(III')

wherein $R^4$ represents an alkyl group having 1 to 30 carbon atoms.

5. The polyacetal copolymers as claimed in claim 1, wherein the relative amount of the copolymerized cyclic ether compound (C) is 0.1 to 10 part(s) by weight.

6. The polyacetal copolymers as claimed in claim 1, each having an Avrami index m of 3.

7. The polyacetal copolymers as claimed in claim 1, wherein the relative amount of the copolymerized cyclic ether compound (C) is 0.05 to 15 part(s) by weight.

8. The polyacetal copolymers as claimed in claim 1, wherein the glycidyl ether compound (B) is any one of the formulas (I), (II) and (III).

9. The polyacetal copolymers as claimed in claim 1, wherein the glycidyl ether compound (B) of the formula (I) has at least an ortho-substituent $R^1$.

10. The polyacetal copolymers as claimed in claim 9, wherein the ortho-substituent $R^1$ exerts steric hindrance in the formula (I).

* * * * *